March 4, 1930.                G. S. TUNE                1,749,115
                        ELECTRIC STORAGE HEATER
                         Filed June 7, 1927         3 Sheets-Sheet 2
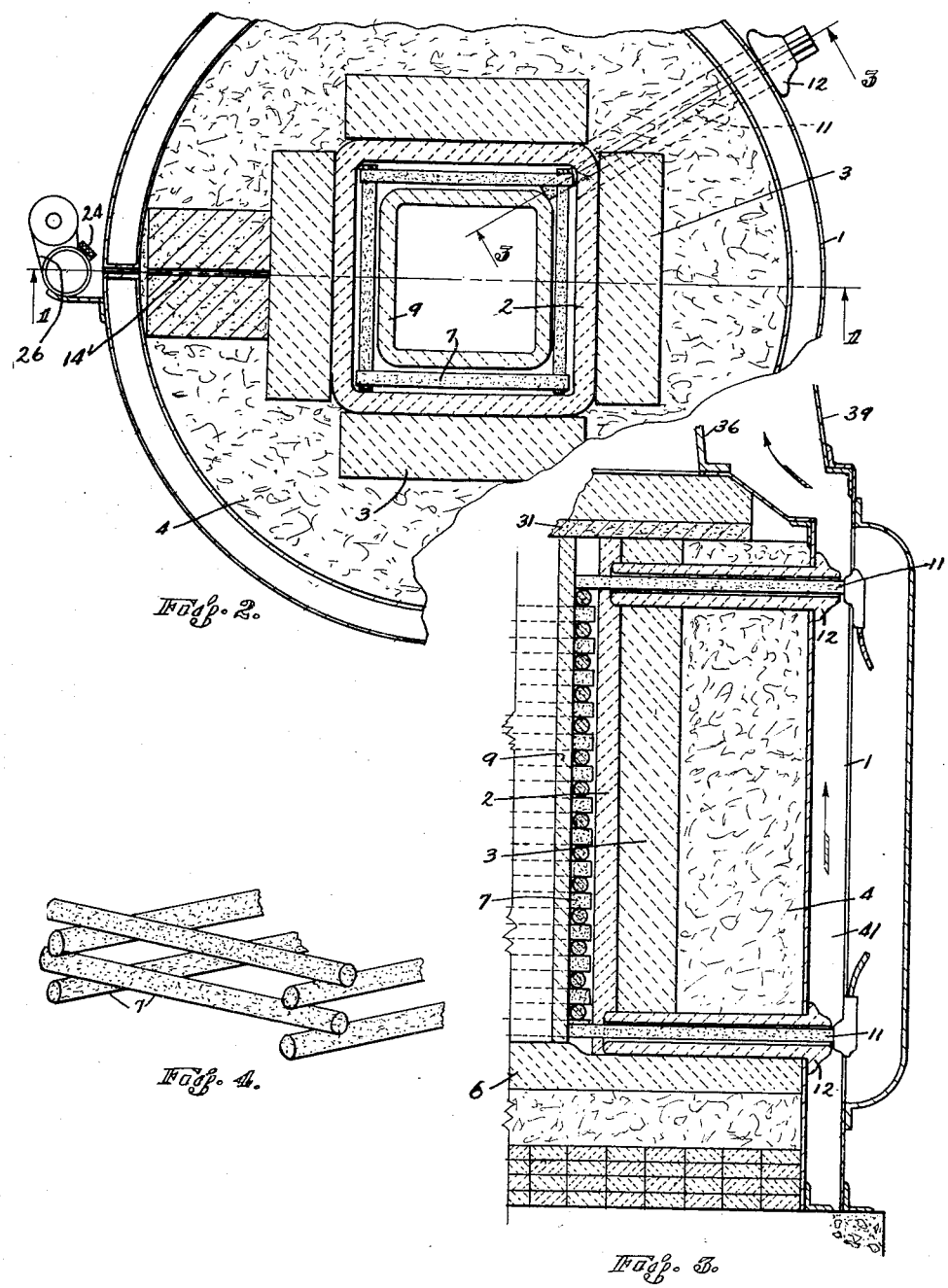
INVENTOR
GUNNAR S. TUNE
BY
ATTORNEYS.

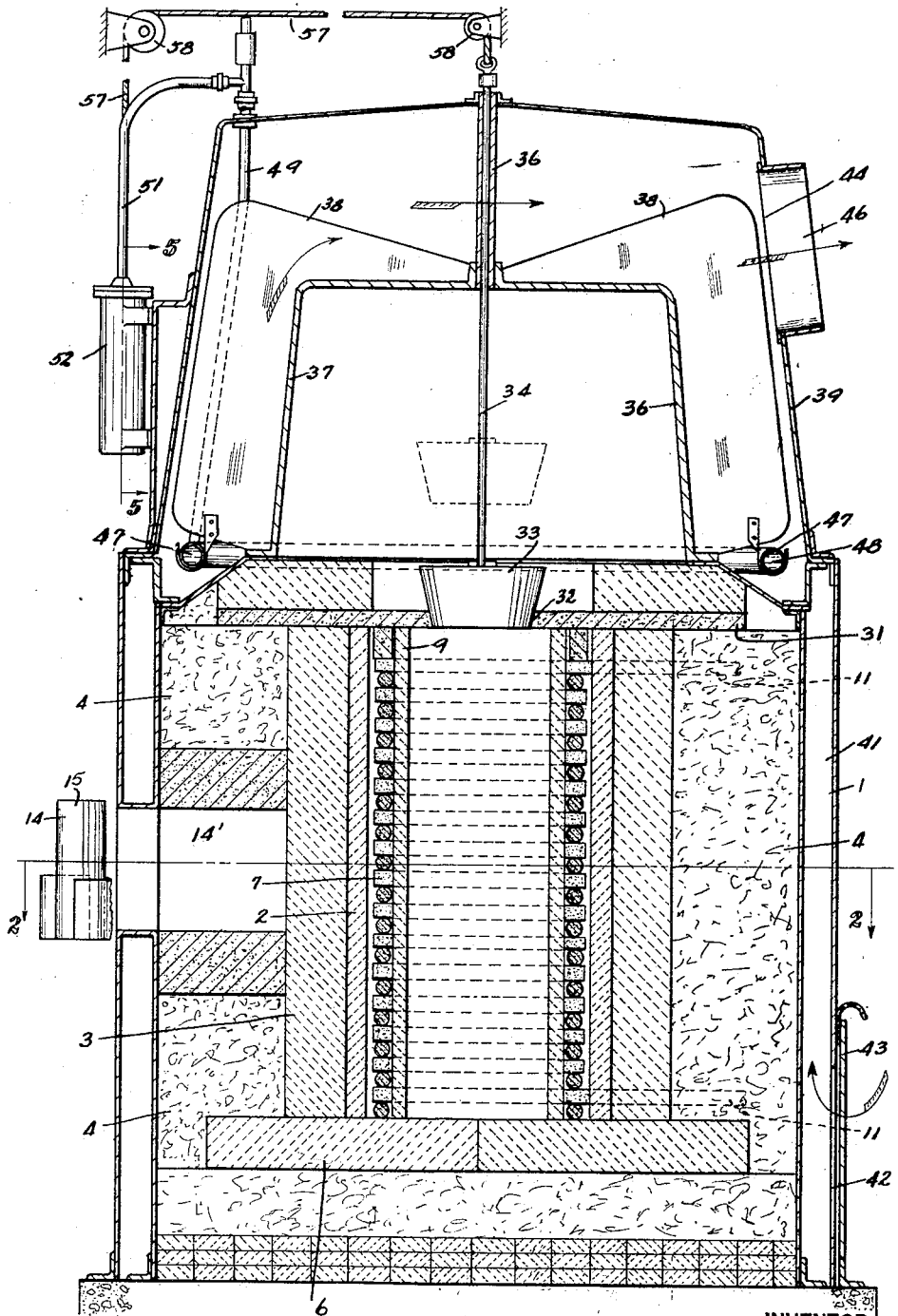

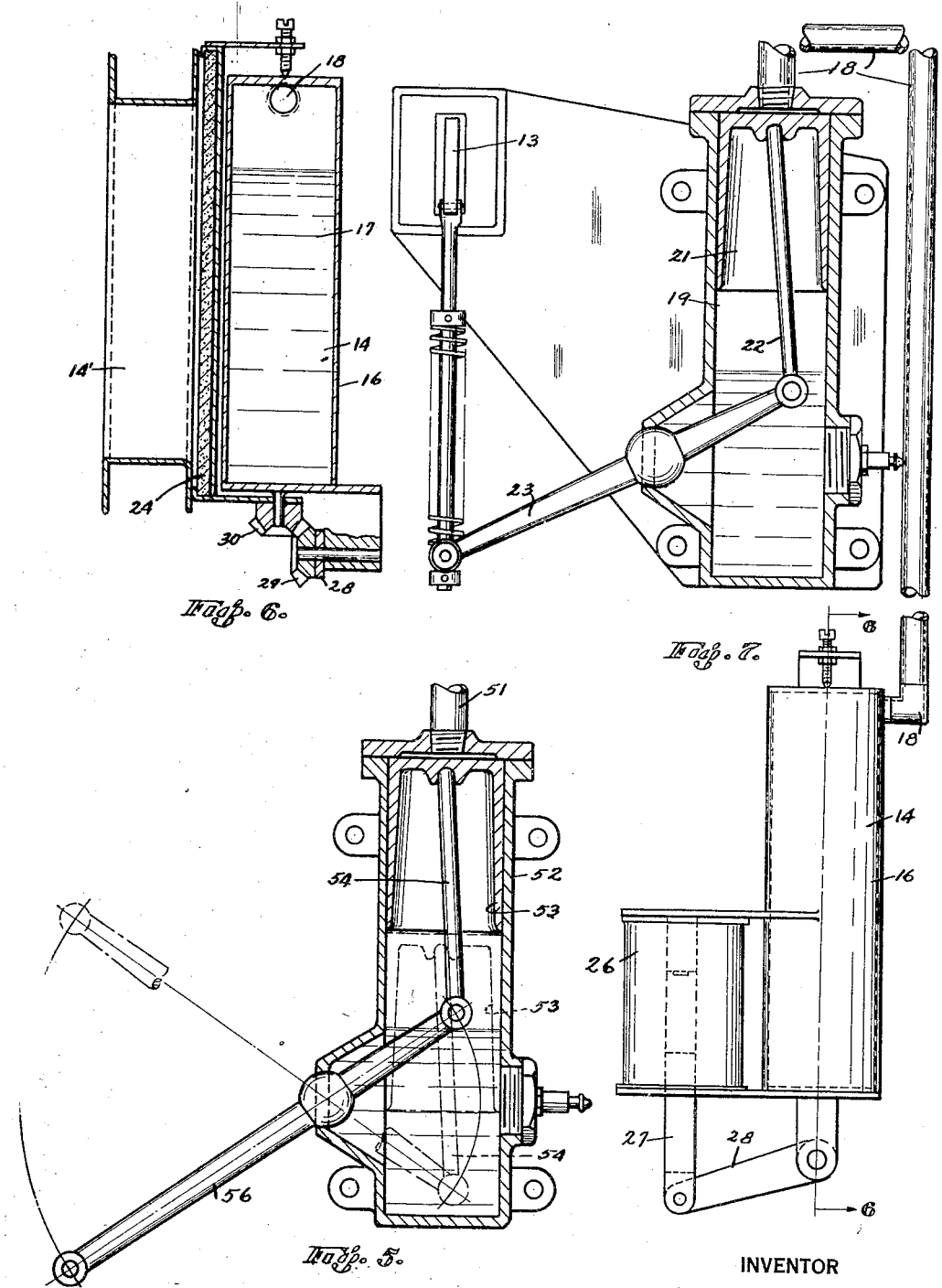

Patented Mar. 4, 1930

1,749,115

UNITED STATES PATENT OFFICE

GUNNAR S. TUNE, OF OAKLAND, CALIFORNIA

ELECTRIC STORAGE HEATER

Application filed June 7, 1927. Serial No. 197,061.

The present invention relates to improvements in heaters and has particular reference to an electric storage heater in which a large amount of heat produced by electricity may be stored, and in which means are provided to withdraw the heat under control at such times as may be desired for various purposes as, for instance, for furnishing a heating system for a house or for heating water and the like. It is particularly proposed in the present invention to provide means whereby electric current may be consumed during those hours of the day during which consumption is limited, and may be used in the form of heat at times when the electrical distributing system carries its peak load. It is further proposed to provide in connection with an electric storage heater of the character described certain automatic control means disconnecting the heater from the source of energy when a maximum of heat has been stored, and other control means regulating the supply of heat from the heater in accordance with the requirements of the system to be heated.

Further objects and advantages of my invention will appear as the specification proceeds.

The preferred form of my invention is illustrated in the accompanying drawing, in which Figure 1 shows a vertical section through my electrical storage heater;

Figure 2, a fragmentary horizontal section taken along line 2—2 of Figure 1;

Figure 3, a vertical section taken along line 3—3 of Figure 2;

Figure 4, a perspective detail view of a portion of an electrical heating unit;

Figure 5, a section taken along line 5—5 of Figure 1;

Figure 6, a section through a control means for the heater; and

Figure 7, a side view thereof in combination with a sectional view of a switch operating mechanism.

While I have shown only the preferred form of the invention, I wish to have it understood that various changes or modifications may be made within the scope of the claims hereto attached without departing from the spirit of the invention.

My electrical storage heater 1 comprises a heavy hollow body of refractory material adapted to absorb and retain heat. The body is shown in the drawing to comprise a rectangular wall 2, heavy blocks 3 arranged adjacent the sides thereof and a further body of refractory material 4 surrounding the structure and presenting a cylindrical outer face. The bottom of the body also comprises heavy blocks 6 of refractory material and a substantial foundation of similar material on which the blocks rest.

Within this body there is provided a stack of bars 7 of conducting material preferably carbon, the bars being stacked in the manner shown in Figure 4, so that they intersect one another and provide contacts over limited areas which heat up to a high degree when a current is passed through the stack. The bars are preferably round so that the area over which they contact are almost reduced to points. Within the stack of bars there is provided an inner wall 9 of refractory material made of the same shape as the wall 2 previously referred to. The stack of carbon conductors is suitably connected into an electrical circuit through the leads 11 which are preferably guided through porcelain conduits 12.

When an electrical current is passed through the stack of carbon bars heat is generated in the contact points, and this heat is absorbed by the refractors 2, 3 and 9, which gradually become red hot and subsequently incandescent. For the purpose of avoiding too high a temperature a limit switch 13 (see Figure 7) is provided which is operated by means of a thermostat 14 arranged adjacent the body of the heater and opposite a slot 14' formed in the outer wall thereof. This thermostat comprises a cylinder 16 partly filled with a liquid 17 and communicating through a pipe 18 with the top of a second cylinder 19 having a piston 21 reciprocable therein. When the heat within the heater exceeds a predetermined degree the pressure of the vapors rising from the liquid forces the piston 21 downwardly and actuates through a piston rod 22 a lever 23 which latter opens the switch 13. When the heater cools off the vapors condense and the piston 21 is returned by the pressure of the compressed air below the same, so that the switch is closed again. The cylinder 16 has a shutter 24 pivoted thereto coaxially and the shutter is operated to move to a slot closing position when the current is turned off, and to a slot opening position when the current is turned on, by means of a solenoid 26 connected into the circuit of the switch 13 and operating the shutter 24 through its plunger 27, a link 28 and the bevel gears 29 and 30, the descending plunger closing the shutter when the solenoid is de-energized, and the ascending plunger opening the shutter when the solenoid is energized.

The body structure of the heater thus far described is covered by a plate 31 formed with an opening 32 above the inner wall 9, and a valve 33 mounted on a rod 34 is guided in a sleeve 35 for vertical movement for opening or closing the hole 32. The body structure is surmounted by a radiator 36 comprising a dome 37 having a plurality of heat radiating fins 38 extending therefrom. The entire structure is surrounded by a bell 39 shaped to follow the outlines of the heater in spaced relation thereto, so as to form an annular chamber 41 around the body of the heater. At the lower end of the bell there is provided an opening 42 adapted to be closed by means of a door 43. Near the top end of the bell is provided an opening 44 for connection to a conduit 46 leading to a heating system.

It will be noted that when the valve 33 is opened heat rises from within the inner wall 9 of the heater into the dome 36 and is communicated to the fins 38. This causes a draft around the heater and causes air to rise through the annular chamber 41, past the fins into the conduit 46, from which it may be discharged into the heating system. The degree to which heat units are absorbed by the passing air depends upon the degree to which the valve 33 has been raised and the degree of heat absorption is therefore controlled by the valve 33.

It is desirable that the heat radiated should be somewhat in proportion to the amount of air passing through the system, that is radiation should be reduced when little air passes, and should be increased with an increase in the current of air. For this purpose I provide an annular pipe 47 surrounding the radiator below the fins and filled with a liquid 48, and communicating with a vertical tube 49 which latter through a tube 51 discharges into the upper end of a cylinder 52 fastened to the outside of the bell 39. This cylinder which is shown in section in Figure 5 has a piston 53 reciprocable therein, and the piston operates the valve 33 through the rod 54, a lever 56 and a cable 57 guided over suitable sheaves 58. As the air current decreases the heat around the pipe 47 increases and causes pressure to be created by evaporation of the liquid 48, which pressure communicates itself to the piston 53, forcing the same downwardly and thereby lowering the valve 33 for reducing the heat radiated. In a similar manner increase in the air current causes the valve 33 to open.

The operation of the device should be readily understood from the foregoing description. As a current is passed through the stack of carbon bars 7 extremely high heat is produced at the points of contact, and the refractors surrounding the stack are raised to an incandescent heat. When a certain maximum degree of heat has been reached the current is automatically turned off through pressure created in the cylinder 16 and communicated to the cylinder 19 for operating the piston 21 and, through the piston rod 22 and the lever 23, the switch 13. The opening of the switch also causes the solenoid 26 to become deenergized which allows the plunger 27 to drop and to move the shutter 24 in front of the opening 14 through the link 28 and the bevel gears 29 and 30.

The heat is now stored in the incandescent body of refractory material and may be consumed at any time desired through opening of the conduits of the heating system. When the conduit 46 and the door 43 are opened cold air rises through the chamber 41 absorbing heat from the radiator and distributing the same throughout the system. The amount of heat units furnished by the heater is controlled by the arrangement of the pipe 47 which when cooling under the influence of a heavy air draft causes the valve 33 to open further, and when heated as a result of a reduction in draft causes the valve 33 to close.

I claim:

1. In an electric storage heater of the character described, a hollow body of heat absorbing and heat retentive material, electrical means for heating the same from the inside, a closed radiator surmounting the body and communicating therewith and an air conduit passing the radiator exteriorly for withdrawing heat therefrom.

2. In an electric storage heater, a hollow body of heat absorbing and heat retentive material, electrical means for heating the same from the inside, a radiator having communication with the inside, a valve in said communication, controlled means for withdrawing heat from said radiator and means responsive to temperature changes in the radiator zone operating said valve.

3. In an electric storage heater, a hollow body of heat absorbing and heat retentive material, electrical means for heating the same from the inside, a radiator surmounting the body and having communication with the inside thereof, a valve in said communication, a bell surrounding the body and the radiator to form an annular chamber therewith and intake and discharge openings in said bell arranged to allow air to travel from the intake past the body and the radiator to the discharge opening.

4. In a heater as defined in claim 3, a pipe arranged in the zone of the radiator adapted to have a liquid therein for creating pressure in response to increases in heat, a piston subject to said pressure and an operative connection between the piston and the valve for controlling the latter.

5. In an electric storage heater, a hollow body of heat absorbing and heat retaining material, electrical means for heating the same from the inside, controlled means for withdrawing heat therefrom, a slot in the wall of the body, a heat responsive element mounted in operative proximity to the slot and means operated thereby controlling the electrical means.

6. In a heater as defined in claim 5, a shutter for the slot and means automatically closing the shutter when the electrical heating means is rendered inactive.

7. In an electric storage heater of the character described, a hollow body of heat absorbing and heat retentive material, electrical means for heating the same from the inside, a slot in the wall of the body and heat responsive control means mounted in operative proximity of the slot for controlling the electrical means.

8. In a heater as defined in claim 7, a shutter for the slot and means automatically closing the shutter when the electric heating means is rendered inactive.

GUNNAR S. TUNE.